United States Patent [19]

Haug

[11] 3,963,470

[45] June 15, 1976

[54] PROCESS FOR TREATING DECOMPOSABLE ORGANIC WASTE MATERIALS

[76] Inventor: Lester A. Haug, 7725 Anise Ave., Los Angeles, Calif. 90045

[22] Filed: Dec. 27, 1974

[21] Appl. No.: 536,854

Related U.S. Application Data

[63] Continuation of Ser. No. 327,986, Jan. 30, 1973, abandoned.

[52] U.S. Cl. ........................................ 71/9; 71/12; 210/15
[51] Int. Cl.² .................................... C05F 11/08
[58] Field of Search .................. 71/8, 9, 10, 12, 13; 210/15, 2, 3, 4, 9, 10, 16

[56] References Cited
UNITED STATES PATENTS

| | | | |
|---|---|---|---|
| 2,474,833 | 7/1949 | Eweson | 71/9 |
| 2,798,800 | 7/1957 | Geraghty et al. | 71/9 |
| 2,820,703 | 1/1958 | Dresser et al. | 71/12 |
| 2,969,279 | 1/1961 | Pierson | 71/9 |
| 3,142,557 | 7/1964 | Mac Duffie et al. | 71/9 |
| 3,357,812 | 12/1967 | Snell | 71/9 |
| 3,419,377 | 12/1968 | Redman | 71/9 |

*Primary Examiner*—Charles N. Hart
*Assistant Examiner*—Ernest G. Therkurn
*Attorney, Agent, or Firm*—Lyon & Lyon

[57] ABSTRACT

A process for treating wastes containing organic solids by composting wherein previously composted and/or otherwise partially dried organic material of the same or similar type is periodically mixed with additional wet material so as to obtain a mixture having an optimum moisture content such that natural aerobic decomposition takes place on a sustained basis.

5 Claims, No Drawings

PROCESS FOR TREATING DECOMPOSABLE ORGANIC WASTE MATERIALS

This is a continuation, of application Ser. No. 327,986, now abandoned, filed Jan. 30, 1973.

BACKGROUND OF THE INVENTION

Several methods for treating organic wastes have been in use throughout the country for some time. Hereinafter the process of the present invention shall be explained in connection with the treatment of sewage sludge but it shall be understood that sewage sludge is but a portion of the types of materials which can be treated according to the present process, which materials could be defined by the more general term "organic solids" and it shall be understood that the same process described herein concerning sewage sludge shall apply with equal utility to other organic solids that may be initially too moist for efficient development of aerobic thermophilic organisms. Raw or undigested sewage sludge typically consists of approximately 6% solid material. Anaerobically digested sewage sludge is a mixture of approximately 4% solids and 96% water. Dewatering and concentration of sludge is generally accomplished either by centrifugation, filtration or evaporation, bringing it to a higher concentration of solids. To aid the thickening process, sludge is frequently conditioned by the addition of polymers, chemicals or the application of heat.

After digestion and concentration of sludge the next step is disposal, either to the atmosphere, the water or the land. Concentrated sludge can be disposed of to the atmosphere by incineration and the resultant ash disposed of in a landfill or the like. Concentrated sludge is also frequently disposed of to the water by dilution in a large volume or it can be disposed of to the land in a sanitary landfill mixed with other waste solids such as municipal refuse. Frequently, concentrated sludge is applied to the land as a humus-type fertilizer. When used as fertilizer, it is customary to air-dry the concentrated sludge before application to the land and air drying takes a long period of time. Alternately, heat may be applied to accelerate the drying process. It is obvious that all of these disposal methods are costly, some more so than others. It is equally apparent that many of these disposal methods may pose a threat to the environment, and in any case with the exception of agricultural use of digested concentrated sludge, disposal is almost entirely without benefit to the environment, and disposal of a sludge, including agricultural use, may be restricted by some governmental agencies.

The application of sewage sludge solids to the land as a liquid after anaerobic digestion, either with or without further drying has received considerable attention in recent years and appears an acceptable method of ultimate disposal. This method, however, has several principal disadvantages. First of all during cold weather months it is usually necessary to store much of this material and storage of this noxious, decomposing material is a nuisance to surrounding landowners. Considering the volumes encountered in some metropolitan areas, the problem of storage becomes a problem of space. The second major disadvantage is not only the increased cost of treatment to assure reduction of all pathogens, but also the cost of transporting a large volume and weight of material most of which is water to the disposal site. Another disadvantage of the other systems of disposal and treatment is that the digestion, thickening, conditioning, dewatering and air drying do not destroy all pathogens nor the germination potential of some seeds.

SUMMARY OF THE INVENTION

It is the primary object of the present invention to provide a process for treating organic solids, and particularly sewage sludge, to reduce the solids to an inert, humus-like state which can thereafter be stored without nuisance to others, can be sold as humus fertilizer or which can be transported for bulk application to the land or sequestered in a landfill and wherein the transportation costs are substantially reduced because of the decrease in weight of material. In addition, the commercial value of the by-product of the process can offset some of the treatment and disposal costs.

More specifically, it is an object of the present invention to set forth a new process for treating waste organic solids by a repetitive composting process wherein wet sludge is periodically added to partially dried and composted sludge solids maintaining the moisture content within the range necessary for the thermophilic organisms to continue the decomposition process. It is another object of the present invention to provide a process for treating organic solids with a minimum of cost and providing a fertilizer material that can be sold so as to offset the cost of processing it. It is an additional object to provide a process for producing a dry humus-type material from organic solids, substantially inert, free of pathogens and the like.

Further objects and advantages of the present invention will readily occur to those skilled in the art.

DESCRIPTION OF THE INVENTION

The first step in the method is to prepare a quantity of partially dried sludge having a relatively low moisture content, about 30%. This first quantity of material is to be used as a starter bed as will be more fully described subsequently. The initial quantity of dried material may be prepared in a number of ways. Sewage sludge, either raw or digested can be used in this process, and as previously mentioned, the moisture content of such material is typically 94 to 96%. The material can be dried by heating, lagooning or mixing it with a quantity of dry inert material such as sawdust, earth or municipal refuse or can be further processed, as previously mentioned, by filtration, centrifugation and the like. If desired, concentration of this initial quantity of material can be done all the way down to a moisture content of 25 to 30% or the material can be reduced in moisture content to about 50% and then composted according to the techniques of the present process.

Next, the initial starter batch of material is spread out either in open fields in windrows or as a wide bed, or under cover. If the material has initially only been reduced to a moisture content of about 50%, then the windrows are left to permit the composting process to take place under aerobic conditions. While the composting process is occuring, the mass in the windrows is periodically turned mechanically using any one of a variety of mechanical devices to accomplish that purpose so as to obtain an aerobic or semi-aerobic condition in the mass. I have found that during the initial days after the material is first layed out into the windrows, it is usually necessary to turn the rows once a day for the first five days or so. As decomposition continues, the sludge mass heats from the activity of thermophilic and mesophilic organisms reaching temperatures of 140° to 155°F and decreases in volume and moisture content. The volume of solids decreases as a result of decomposition of the volatile solids, the majority of which escape as carbon dioxide gas. The moisture content decreases due to evaporation, accelerated by the elevated temperatures in the decomposing mass. As the moisture content drops, it becomes easier for air to circulate in the mass of material so it becomes unnecessary to turn the mass mechanically as frequently as in the initial stages. In addition, it is advantageous to turn the mass less frequently as moisture content decreases, so as to maintain a higher heat level in the mass, which results in greater and more rapid volume reduction and more effective reduction of pathogens. Of course the frequency of turning the mass is to some extent dependent upon rainfall, wind, temperature and humidity conditions. Typically, in about 15 days the mass will have reduced to a moisture content of about 30% at which point decomposition has vertually stopped. It is this initial mass of material having a moisture content of about 30% which provides a starter for the process.

The next step after obtaining a mass of partially dried material, whether composted or otherwise dried, is to spread the material in windrows forming absorbent pads. Then, additional wet organic material of the same type being processed, here sewage sludge, is deposited upon the pads and mixed in quantities such that the resulting mixture will have a moisture content in the range of 40 to 60%. That moisture range is the one which is most favorable for the immediate initiation of the decomposition of sewage sludge, although the most favorable moisture content may vary for other organic substances. If concentrated sewage sludge is used, typically having a moisture content of about 75%, addition of each additional quantity of material to the windrow results in the addition of about an equal amount of new material as compared to that already present, thus approximately doubling the amount of material processed each time more is added to the windrow. The added material is mixed with the partially dried material and thereafter each windrow is turned periodically by mechanical equipment as previously described, initially turning the rows frequently, about once a day for the first few days and thereafter less frequently as previously mentioned. When the moisture content in the volume of solid material has again reduced to about 30%, i.e., decomposition has virtually stopped, a further quantity of wet sludge is added such that the amount of moisture for rapid decomposition is again available in the resulting mixture. Following each addition of wet sludge to the partially dried and composed absorbent pad of sludge, and mixed with it, it is thereafter periodically aerated until the mass has composted and dried to the degree that the process can be repeated again.

When the volume of dried material produced exceeds the requirement for mixing purposes, the excess can be separated and stored, leaving enough for the next cycle of the process. The optimum moisture content for storage appears to be about 25% but it is also possible to leave the material in the windrows and let it dry further until it is completely composted to an inert humus-like state.

The mechanical process for aerating the batches of wet and dry sludge can be accomplished in the open air in windrows or in an area-wide bed of material. Alternately a structure can be provided to house the process under roof and special turning and aerating devices may be constructed to perform the mechanical process of mixing and aerating the batch as needed to maintain aerobic decomposition conditions. It is one of the principal advantages, however, of the present process, and one which distinguishes it from the prior art, that turning and mixing does not have to be continuous as some investigators of organic solid composting have previously thought, as composting will continue to completion with only occassional aeration. Nor is it necessary to mix the wet sludge with other types of dry materials such as ground refuse or sawdust as other researchers have done.

Assuming that the process was begun with concentrated sludge having 30% solids, in a quantity sufficient to produce about 100 tons per day of solids on a dry weight basis, of the solids present in the wet concentrated sludge about 50% are volatile solids. After the composting process is finished, the remaining material is 25% moisture and 75% solids. Due to the loss of most of the volatile materials, the remaining solids are about 30% volatiles. This yields then 50 tons of inert material and a remaining 21 tons of volatile solids for a total of 71 tons on a dry weight basis. This 71 tons of solid materials at a composition of 75% solids means a total material weight of about 95 tons. Thus, the 95 tons includes 24 tons of water. Therefore, the composting process has eliminated 29 tons of volatile solids and 176 tons of water for a total elimination of 205 tons or a 68% reduction in weight.

As previously mentioned, one of the principal methods of disposing of wet sludge is to haul the concentrated material to a sanitary landfill for disposal. Obviously, if the cost of hauling is computed on a weight basis, the 68% reduction in weight represents a substantial savings in operating costs. For example, if hauling the material costs $4.50 a ton, the same quantity of solid material treated according to the present invention can be transported at a cost of about $1.50 a ton. Thus, the present process offers a means for effectuating a substantial savings in operating costs for municipalities which must dispose of their wastes from sewage.

While a particular process has been described herein it will be obvious to those persons skilled in the art that changes and modifications might be made therein without departing from the concept of the present invention. It will be at once apparent that variations may be made in the frequency of turning the windrows, the time allowed for completion of the composting process of each mixture, et cetera, depending upon ambient weather conditions, the type of solids being treated and the like, but it is considered that all types of decomposable organic wastes can be treated according to the process herein described. Those skilled in the art will recognize that other aids may be used with the present process, such as external heat, diffusion of air through the mass by vacuum or pressure, addition of non-analogous drying agents such as sawdust or refuse, or addition of nutrients, accelerators, cultures, innoculants and other conventional addends, but such aids are not necessary to this process in its basic aspects, although it is recognized that they might enhance the effectiveness thereof. It is the aim hereof to include all such changes and modifications as fall within the true scope and spirit of this invention.

I claim:

1. A process for the sustained treatment of decomposable wet sewage sludge to produce a partially dry humus-like substance, the steps comprising:
   partially drying a first quantity of said wet material, spreading said first quantity of material to form an absorbent pad;
   mixing with said first quantity of partially dry material an additional quantity of sewage sludge to produce a mixture having an initial moisture content sufficient to initiate aerobic decomposition;
   periodically turning said mixture in ambient uncontrolled atmospheric air to aerate the same by exposure to naturally occurring quantities of ambient air until decomposition substantially ceases and said mixture is partially dry;
   successively repeating said steps of adding wet material of the same or similar type and periodically turning the mixture until decomposition ceases; and
   from time to time removing from said partially dried mixture a portion of partially dry humus-like substance.

2. A process for the sustained treatment of wet sewage sludge to produce a partially dry humus-like substance, the steps comprising:
   partially drying a first quantity of said wet sewage sludge to a moisture content of about 30%, spreading said first quantity of material to form an absorbent pad;
   spreading an additional quantity of sewage sludge in wet condition upon said pad and mixing said quantities together, the amount of said additional quantity being sufficient to provide a mixture having a moisture content of about 40 to 60%;
   periodically turning said mixture in ambient uncontrolled atmospheric air to aerate the same by exposure to naturally occurring quantities of ambient air until decomposition therein has substantially ceased and the moisture content has reduced to about 30%;
   successively repeating the aforesaid steps of adding wet sewage sludge to partially dried material and then periodically turning the mixture until decomposition thereof ceases; and
   from time to time removing from said partially dried mixture a portion of partially dry humus-like substance.

3. A process for the sustained treatment of wet sewage sludge to produce a partially dry humus-like substance, the steps comprising:
   spreading a first quantity of partially dry sludge and leveling it to provide an absorbent pad;
   mixing a quantity of wet sludge with said first quantity in proportions sufficient to provide an initial moisture content within the range which supports initiation of the composting process;
   periodically turning said mixture in ambient uncontrolled atmospheric air to aerate the same by exposure to naturally occurring quantities of ambient air until aerobic decomposition has substantially ceased and the moisture content thereof has reduced;
   successively repeating said steps of mixing wet sludge with the previously dried mass of sludge and periodically turning the mixture until decomposition has substantially ceased; and
   from time to time removing from said partially dried mass a portion of partially dry humus-like substance.

4. A process for the sustained treatment of wet sewage sludge to produce a partially dry humus-like substance, the steps comprising:
   partially drying a first quantity of wet sewage sludge to a moisture content of about 30%, spreading said first quantity of sludge to provide an absorbent pad;
   mixing with said first quantity of sludge an additional quantity of wet sludge in proportions sufficient to achieve a mixture having an initial moisture content of about 40 to 60%;
   periodically turning said mixture in ambient uncontrolled atmospheric air to aerate the same by exposure to naturally occurring quantities of ambient air until aerobic decomposition has substantially ceased and the moisture content thereof has reduced to about 30%;
   successively repeating said steps of mixing wet sludge with the previously dried material and periodically turning the mixture until decomposition has substantially ceased; and
   from time to time removing from said partially dry mass a portion of partially dry humus-like substance.

5. A batch process for the sustained treatment of wet sewage sludge to produce a partially dry humus-like substance, the steps comprising:
   partially concentrating a first quantity of wet sewage sludge to a moisture content of about 50%, spreading said first quantity to allow initiation of aerobic decomposition, periodically turning said sludge to aerate the same until decomposition therein substantially ceases and the moisture content has decreased to about 30%, leveling said first quantity of sludge to provide an absorbent pad;
   spreading an additional quantity of wet sludge upon said pad and mixing said quantities together, the amount of said additional sludge being sufficient to provide a batch mixture having an initial moisture content of about 40 to 60%;
   periodically turning said batch mixture to aerate the same until decomposition thereof substantially ceases throughout said batch mixture and the moisture content has decreased to about 30%, leveling said batch mixture to form an absorbent pad for another batch;
   successively repeating said steps of adding wet sludge, mixing, turning and leveling each time obtaining an increased mass of partially dry humus-like substance; and
   from time to time removing from said partially dry mass the portion of humus-like substance not used as the absorbent pad for the next batch.

* * * * *